United States Patent
Tsutsumi et al.

(10) Patent No.: US 10,401,722 B2
(45) Date of Patent: Sep. 3, 2019

(54) IMAGE FORMING APPARATUS CONFIGURED TO ADJUST AN IMAGE AROUND A CUT OF A RECORDING MEDIUM

(71) Applicant: FUJI XEROX CO., LTD., Tokyo (JP)

(72) Inventors: Kojiro Tsutsumi, Kanagawa (JP); Yasuto Okabayashi, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 15/903,676

(22) Filed: Feb. 23, 2018

(65) Prior Publication Data

US 2018/0364556 A1 Dec. 20, 2018

(30) Foreign Application Priority Data

Jun. 16, 2017 (JP) .................................. 2017-118181

(51) Int. Cl.
*B41J 11/00* (2006.01)
*G03B 27/50* (2006.01)
*H04N 1/00* (2006.01)
*H04N 1/04* (2006.01)

(52) U.S. Cl.
CPC ......... *G03B 27/50* (2013.01); *H04N 1/00567* (2013.01); *H04N 1/04* (2013.01)

(58) Field of Classification Search
None
See application file for complete search history.

(56) References Cited

U.S. PATENT DOCUMENTS

| 7,207,639 | B2* | 4/2007 | Kachi | B41J 11/003 |
| | | | | 347/14 |
| 7,889,395 | B2* | 2/2011 | Goto | H04N 1/2307 |
| | | | | 358/1.9 |
| 8,395,807 | B2* | 3/2013 | Yada | H04N 1/3875 |
| | | | | 358/1.18 |
| 9,950,438 | B2* | 4/2018 | Kuroda | B26F 1/04 |
| 2018/0253050 | A1* | 9/2018 | Otani | G03G 15/5058 |

FOREIGN PATENT DOCUMENTS

| JP | 2006-231929 A | 9/2006 |
| JP | 2015-154439 A | 8/2015 |

* cited by examiner

*Primary Examiner* — Paul F Payer
(74) *Attorney, Agent, or Firm* — Sughrue Mion, PLLC

(57) ABSTRACT

An image forming apparatus includes an image forming unit that forms an image on a recording medium according to image data, and an adjusting unit that adjusts the image around a cut when the recording medium has the cut.

10 Claims, 14 Drawing Sheets

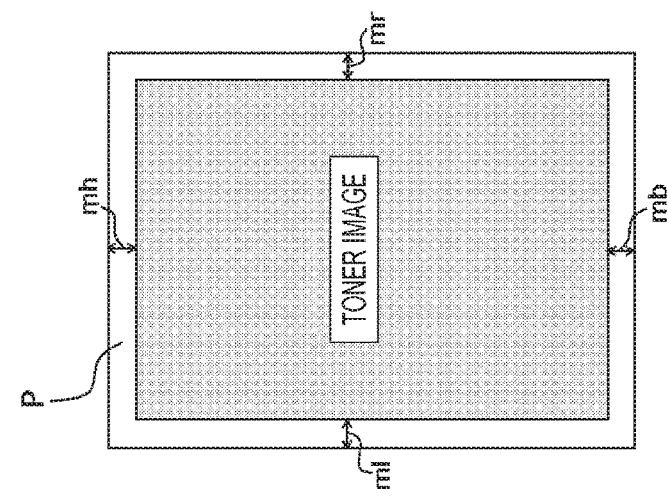
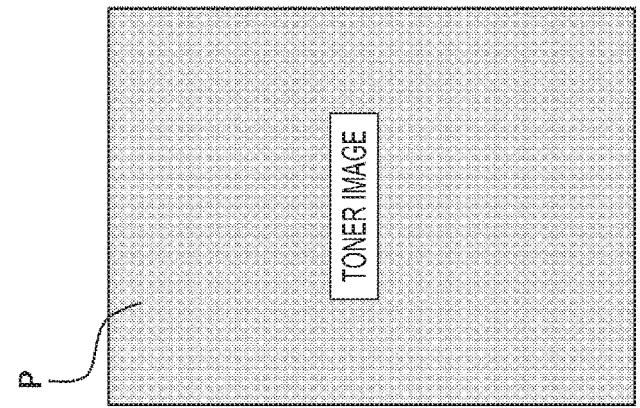
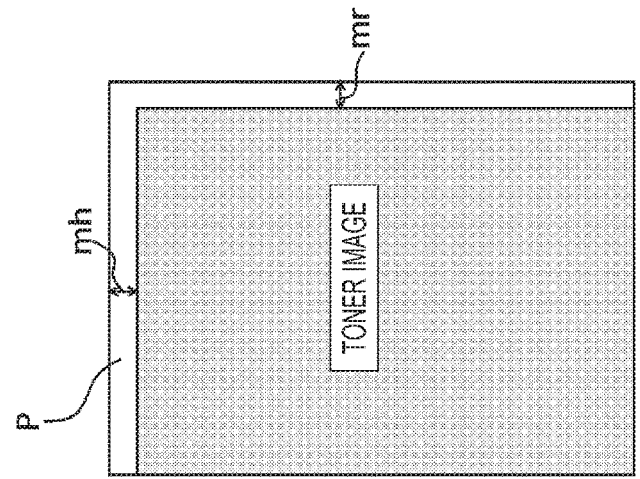

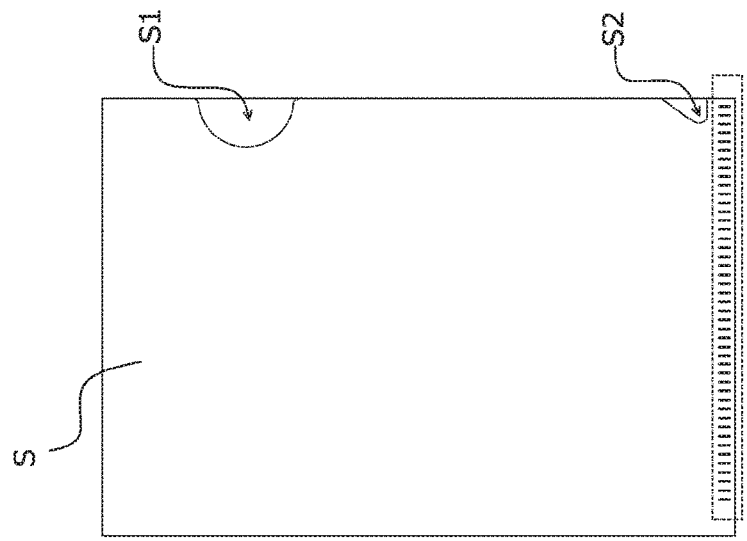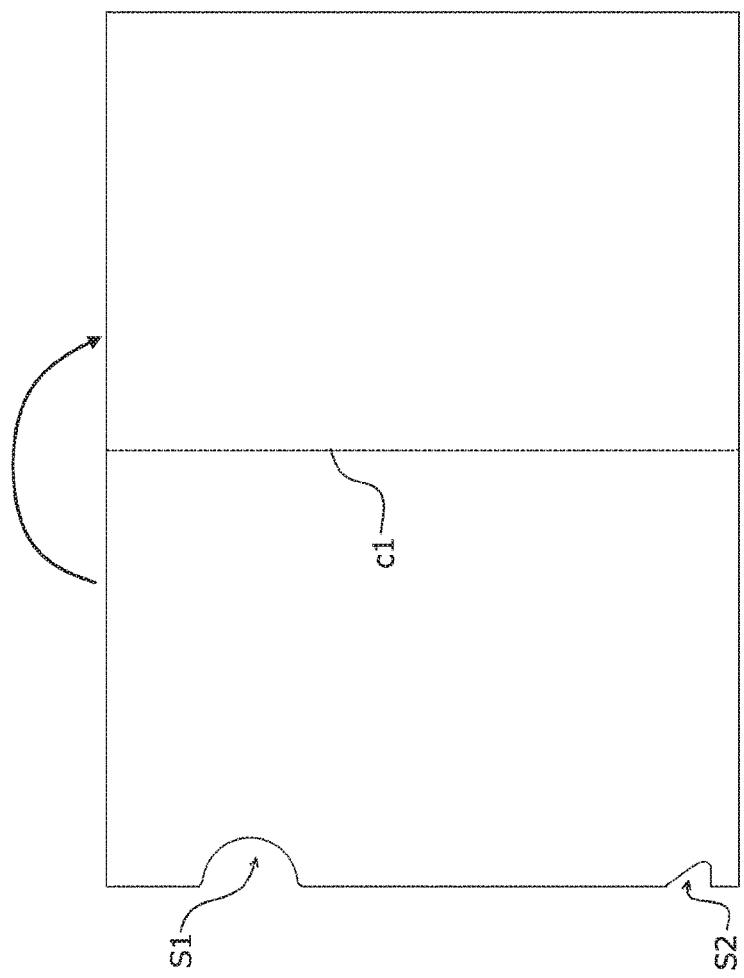

IMAGE FORMING APPARATUS CONFIGURED TO ADJUST AN IMAGE AROUND A CUT OF A RECORDING MEDIUM

CROSS-REFERENCE TO RELATED APPLICATIONS

This application is based on and claims priority under 35 USC 119 from Japanese Patent Application No. 2017-118181 filed Jun. 16, 2017.

BACKGROUND

Technical Field

The present invention relates to an image forming apparatus.

SUMMARY

According to an aspect of the invention, there is provided an image forming apparatus including an image forming unit that forms an image on a recording medium according to image data, and an adjusting unit that adjusts the image around a cut when the recording medium has the cut.

BRIEF DESCRIPTION OF THE DRAWINGS

An exemplary embodiment of the present invention will be described in detail based on the following figures, wherein:

FIGS. 3A, 3B, and 3C explain toner-image formation, respectively, in margin printing, full marginless printing, and partial marginless printing;

FIGS. 5A and 5B illustrate a structure of a clear holder;

DETAILED DESCRIPTION

Next, the present invention will be described in more detail in conjunction with the following exemplary embodiment and specific examples with reference to the drawings. However, the present invention is not limited to these exemplary embodiment and specific examples.

In the following description using the drawings, it is noted that the drawings are schematic and that, for example, the dimensional ratios are different from actual ones. For easy understanding, illustrations of members other than members necessary for the explanation are appropriately omitted.

(1) Overall Configuration and Operation of Printing Image Forming Apparatus

Figure 1:
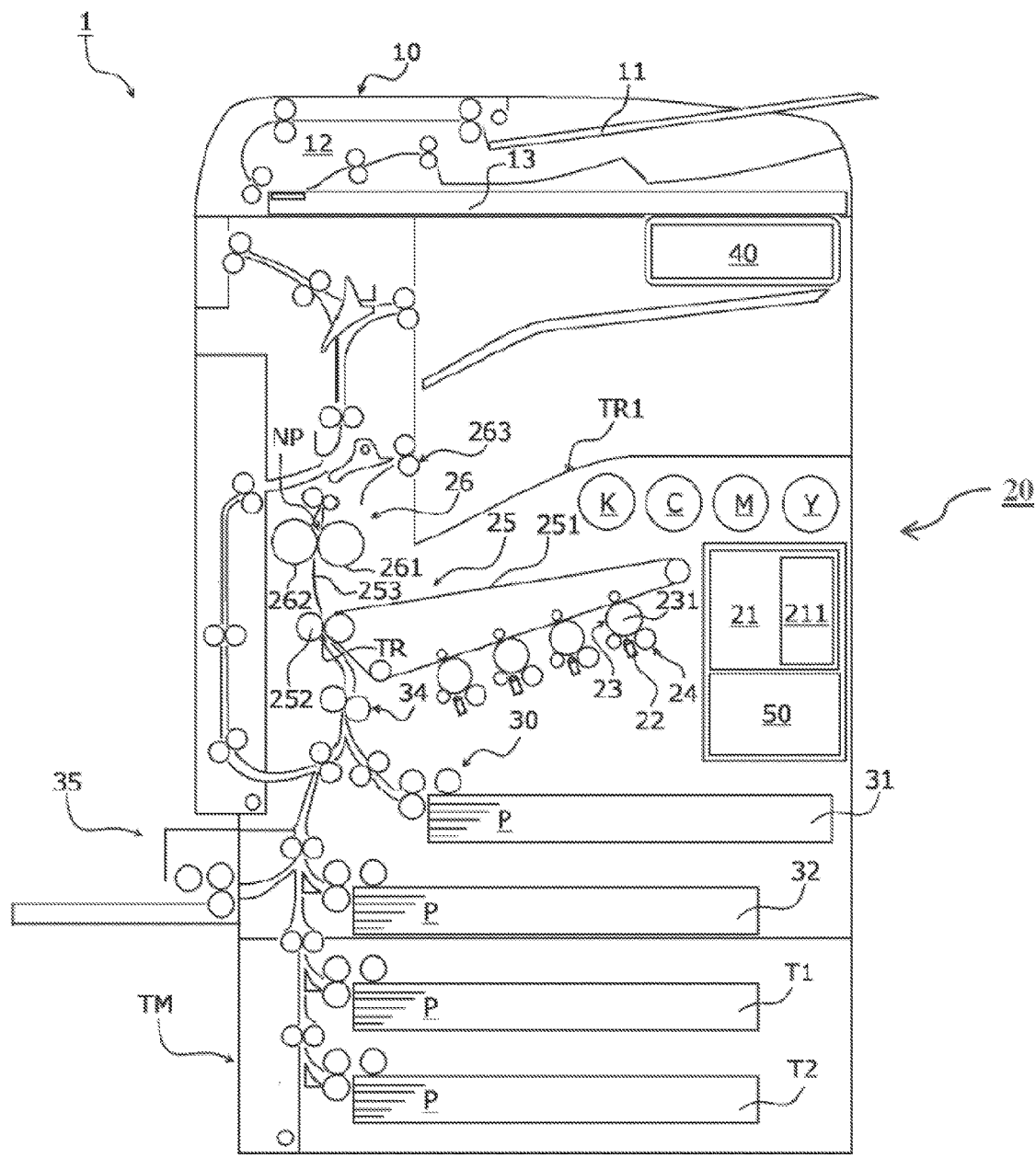
FIG. 1 is a schematic cross-sectional view illustrating an internal configuration of an image forming apparatus.
Figure 2:
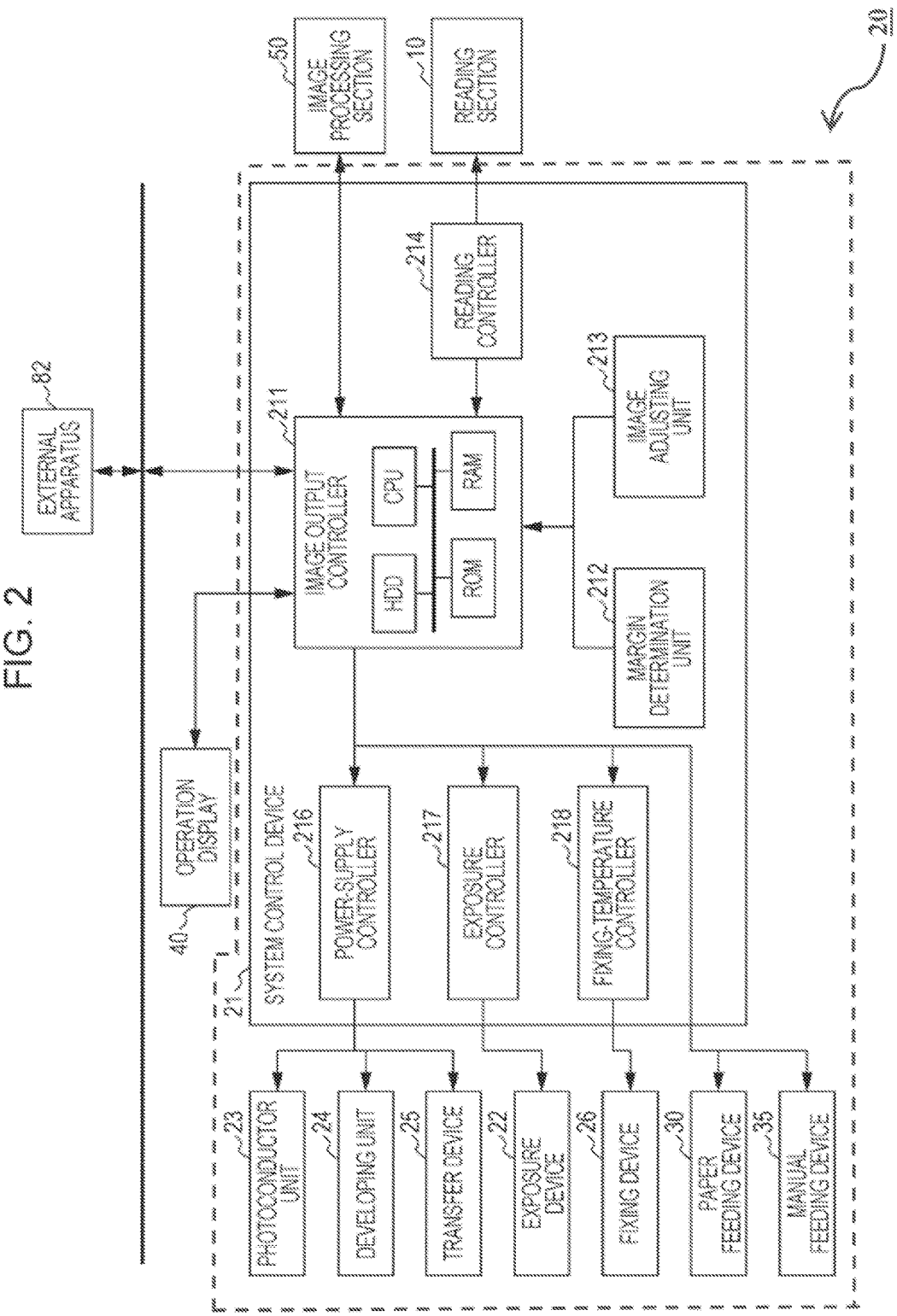
FIG. 2 is a block diagram showing an example of a functional configuration of the image forming apparatus.

FIG. 1 is a schematic cross-sectional view illustrating an internal configuration of an image forming apparatus 1 according to an exemplary embodiment, and FIG. 2 is a block diagram showing an example of a functional configuration of the image forming apparatus 1. FIGS. 3A, 3B, and 3C explain toner-image formation, respectively, in margin printing, full marginless printing, and partial marginless printing, and FIG. 4 explains toner-image formation in marginless printing.

The overall configuration, functional configuration, and operation of the image forming apparatus 1 will be described below with reference to the drawings.

(1.1) Overall Configuration of Image Forming Apparatus

The image forming apparatus 1 includes a reading section 10, an image forming section 20, a paper feeding device 30 loaded in a bottom part of the image forming section 20, an operation display 40, and an image processing section 50. The image forming apparatus 1 has a marginless printing function for printing an image to an end portion of a sheet P without forming any margin in the end portion of the sheet P.

The reading section 10 includes a document mount portion 11, an automatic document feeder 12, and an image reading unit 13. The automatic document feeder 12 transports a document G placed on the document mount portion 11 to a reading position in the automatic document feeder 12. An image read by an image sensor (not illustrated), such as a charge coupled device (CCD) line sensor, in the image reading unit 13 is converted into image data as electric signals.

The image forming section 20 includes a system control device 21, exposure devices 22, photoconductor units 23, developing devices 24, a transfer device 25, and a fixing device 26. The image forming section 20 forms a toner image based on image information received from the image processing section 50 on a sheet P sent from the paper feeding device 30.

In the bottom part of the image forming section 20, a paper feeding device 30 including sheet trays 31 and 32 is provided. Below the paper feeding device 30, a tray module TM including multiple sheet trays T1 and T2 arranged in the up-down direction and containing sheets P (two trays in this exemplary embodiment) is connected to supply the sheets P to the image forming section 20.

On the left side of the image forming section 20, a manual feeding device 35 is provided to supply sheets, such as a sheet of an irregular size, a long sheet, thick paper. A clear holder S used in this exemplary embodiment is fed from the manual feeding device 35.

The operation display 40 corresponds to a so-called user interface, and includes a combination of, for example, a liquid crystal display panel, various control buttons, and a touch panel. The operation display 40 is used to input various settings and instructions and to display information.

The image processing section 50 creates image data from print information transmitted from an external apparatus 82 (illustrated in FIG. 2: for example, a personal computer).

(1.2) Structure and Operation of Image Forming Section 20

In the image forming apparatus 1 having the above-described configuration, a sheet P designated by a print job is sent from the paper feeding device 30 or the manual feeding device 35 into the image forming section 20 in timing to image formation.

The photoconductor units 23 include respective photoconductor drums 231 arranged in parallel to be rotationally driven. On the photoconductor drums 231 on which electrostatic latent images are formed by the exposure devices 22, toner images of yellow (Y), magenta (M), cyan (c), and black (K) are formed by the corresponding developing devices 24.

The color toner images formed on the photoconductor drums 231 of the photoconductor units 23 are electrostatically transferred (first-transferred) in order onto an intermediate transfer belt 251 in the transfer device 25, and are superimposed to form a superimposed toner image. The superimposed toner image on the intermediate transfer belt 251 is collectively transferred by a second-transfer roller 252 onto a sheet P sent out from a registration roller pair 34 and guided by a transport guide.

In the fixing device 26, a fixing nip NP (fixing region) is defined by a pair of heating and pressure modules 261 and 262.

The sheet P on which the toner image is collectively transferred in the transfer device 25 is transported to the fixing nip NP in the fixing device 26 through a transport guide 253 in a state in which the toner image is unfixed. The toner image is fixed by the action of pressure and heating of the heating module 261 and the pressure module 262.

The sheet P on which the fixed toner image is formed is guided by a transport guide, is output from an output roller pair 263, and is received onto an output sheet tray unit TR1 on an upper surface of the image forming apparatus 1.

(1.3) Functional Configuration and Operation of System Control Device

The image forming apparatus 1 includes the system control device 21 containing an image output controller 211, a margin determination unit 212, an image adjusting unit 213, a reading controller 214, a power-supply controller 216, an exposure controller 217, and a fixing-temperature controller 218. The system control device 21 controls the operation of the entire image forming apparatus 1 by executing control programs stored in a memory.

The image output controller 211 controls information exchange with the paper feeding device 30 and the manual feeding device 35, and gives operation control instructions to the exposure devices 22, the photoconductor units 23, the developing devices 24, the transfer device 25, and the fixing device 26 included in the image forming section 20.

The image output controller 211 also gives operation control instructions to the power-supply controller 216, the exposure controller 217, and the fixing-temperature controller 218 included in the system control device 21. That is, the image output controller 211 determines whether or not to perform power supply and driving of the exposure devices 22, the photoconductor units 23, the developing devices 24, the transfer device 25, and the fixing device 26 that constitute the image forming section 20, and gives the determination results to the controllers for the units.

The image output controller 211 further exchanges information with the reading controller 214, and performs a predetermined image reading control when receiving instructions of image reading through the operation display 40.

The reading controller 214 controls the operation of the reading section 10 to read images on documents G stacked on the document mount portion 11 by scanning while transporting the documents G through the automatic document feeder 12 to the image reading unit 13, and receives read image data. The received image data is stored in a memory (HDD).

Further, the image output controller 211 exchanges information with the margin determination unit 212 and the image adjusting unit 213, and performs a predetermined operation control when marginless printing is selected.

The margin determination unit 212 detects the presence or absence of a peripheral margin on the sheet P in the received image data, and determines whether to perform marginless printing or margin printing.

As schematically illustrated in FIG. 3A, in margin printing, a toner image entirely fits in a sheet P, and a peripheral margin including an upper margin (mh), a lower margin (mb), a left margin (ml), and a right margin (mr) exists in a peripheral portion of the sheet P.

In contrast, as illustrated in FIG. 3B, in marginless printing, a toner image reaches end portions of a sheet P, and there is no peripheral margin. While FIG. 3B illustrates a state in which none of an upper margin, a lower margin, a left margin, and a right margin exist, when a margin does not exist in one or some of end portions, as illustrated as an example in FIG. 3C, it is determined this case is marginless printing.

Figure 4A:
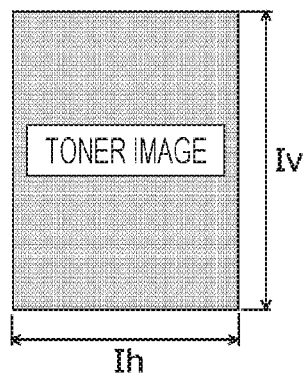
FIGS. 4A, 4B, and 4C explain toner-image formation in marginless printing.
Figure 4B:
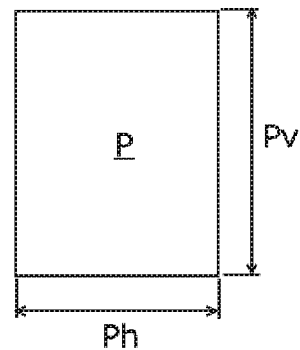

FIG. 4A illustrates the size of a toner image formed on the intermediate transfer belt 151, and the toner image has a vertical size Iv and a horizontal size Ih. FIG. 4B illustrates the size of a sheet P, and the sheet P has a vertical size Pv and a horizontal size Ph.

Figure 4C:
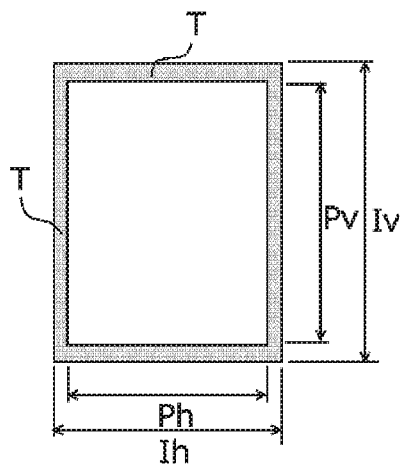

In marginless printing, the size relationship between the toner image and the sheet P is set so that Pv<Iv and Ph<Ih, as schematically illustrated in FIG. 4C. That is, the toner image is magnified at a fixed magnification rate so that the size of the toner image is slightly larger than the selected sheet size to prevent a margin from being formed in the sheet P even when the sheet P is supplied while being slightly displaced in the front-rear direction or the right-left direction.

(2) Printing on Recording Medium Having Cut

Figure 6:
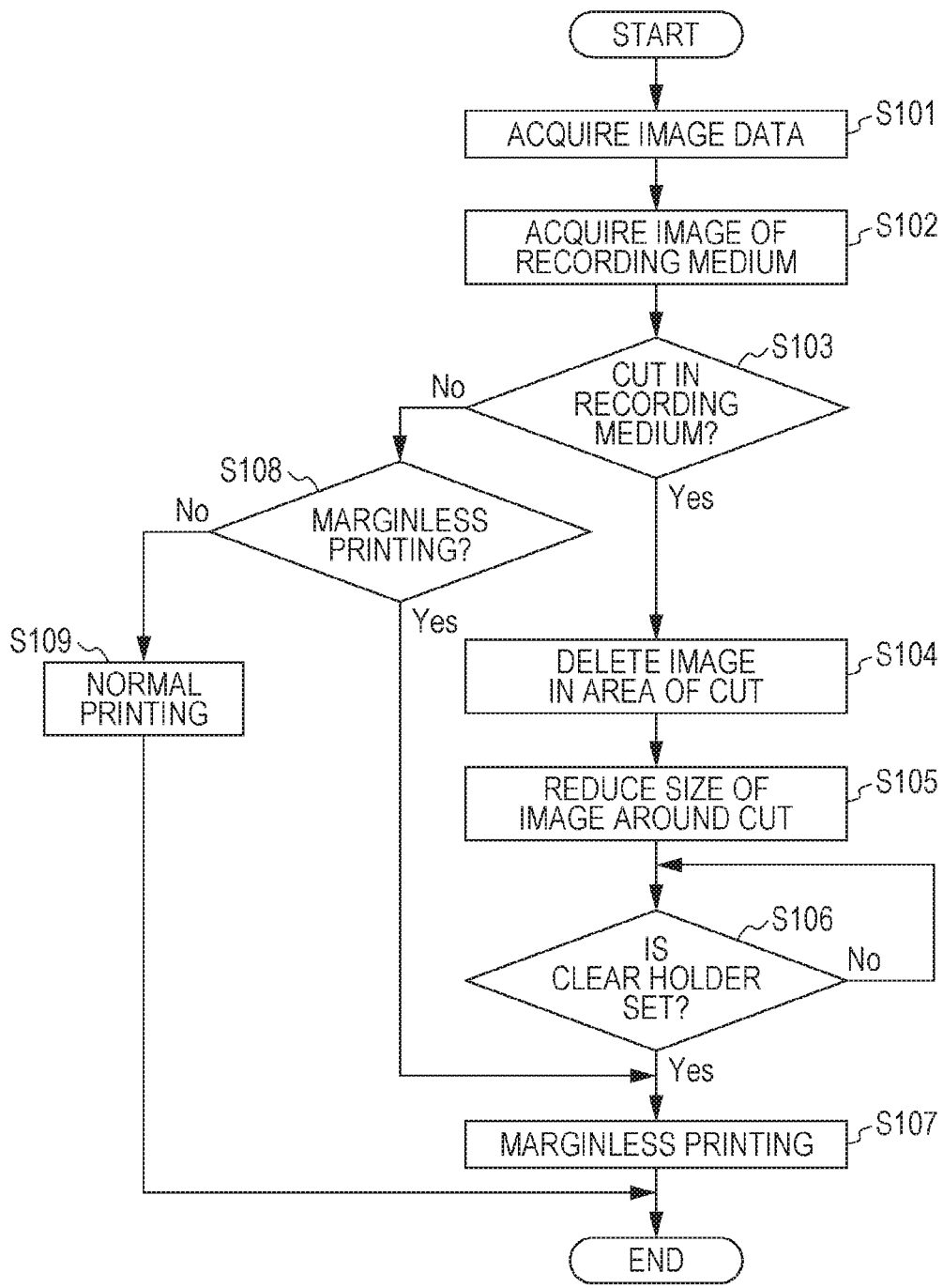
FIG. 6 is a flowchart showing the flow of an image forming operation on the clear holder.
Figure 7:
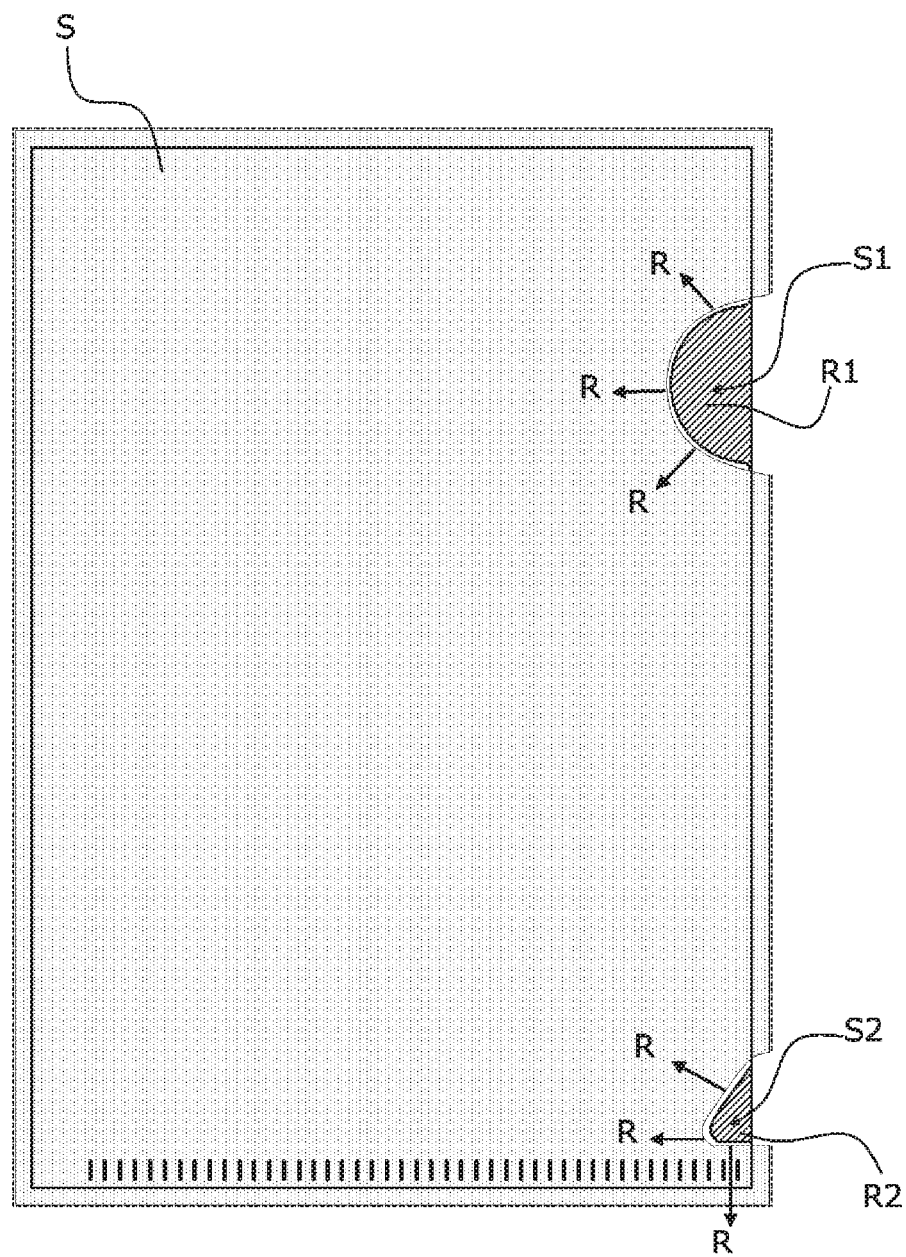
FIG. 7 illustrates formation of an image on a clear holder while reducing the image around cuts.
Figure 11:
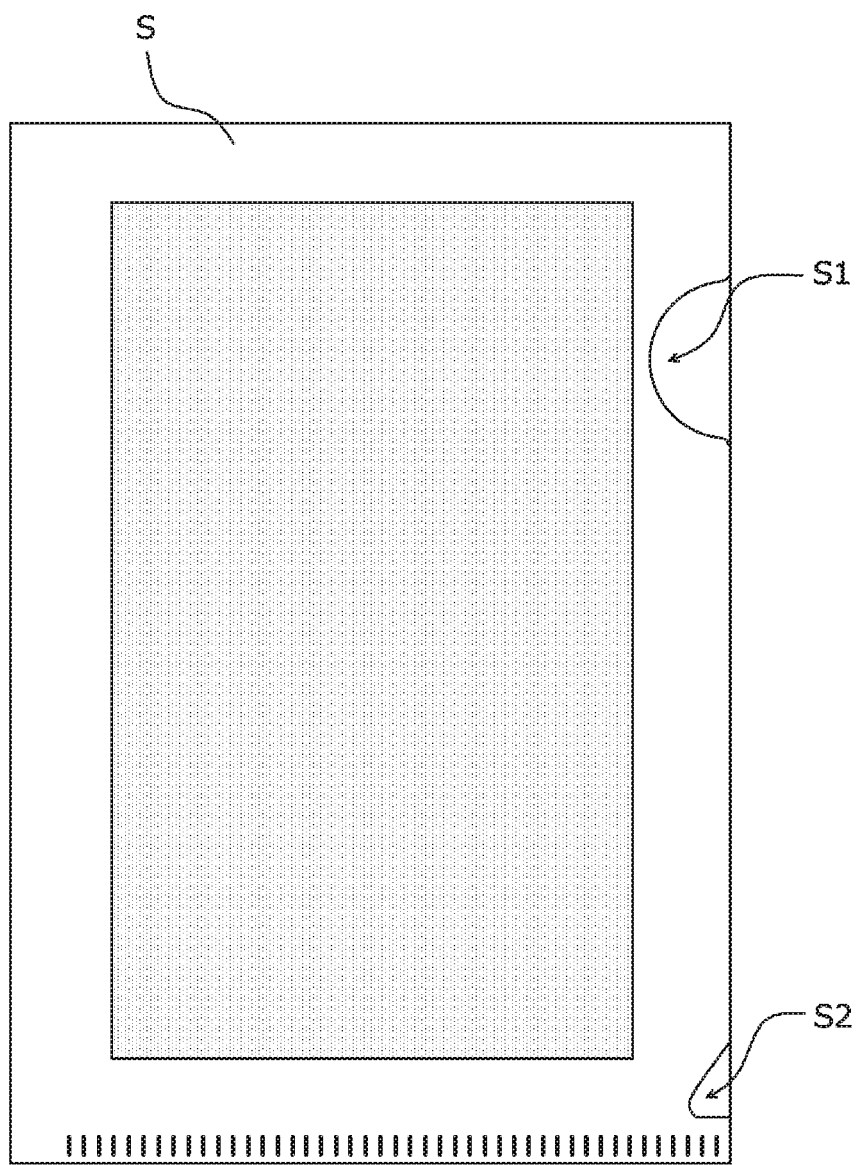
FIG. 11 illustrates image formation on a clear holder except for cuts.
Figure 12:
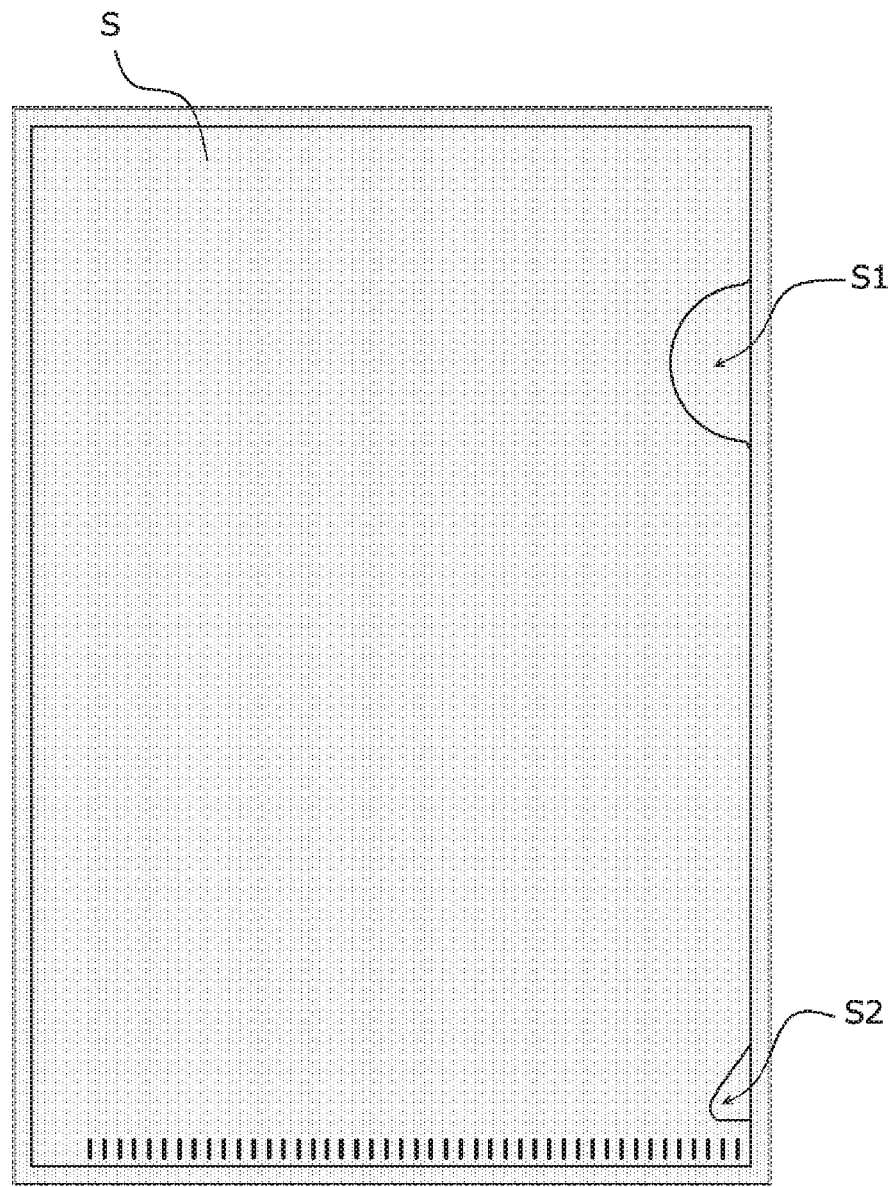
FIG. 12 illustrates marginless printing on a clear holder.

FIGS. 5A and 5B illustrate the structure of a clear holder S, and FIG. 6 is a flowchart showing the flow of operation of printing an image on the clear holder S. FIG. 7 illustrates a case in which an image is formed on a clear holder S while being reduced around cuts, FIG. 11 illustrates a case in which an image is formed on a clear holder S except for cuts, and FIG. 12 illustrates a case in which marginless printing is performed on a clear holder S. A description will be given below of clear-holder printing performed by the image forming apparatus 1 with reference to the drawings.

A clear holder S is a piece of stationery suited to hold, file, store, and carry a document. As illustrated in FIGS. 5A and 5B, the clear holder S is formed by folding a substantially rectangular transparent or semitransparent plastic sheet in two at a folding portion c1 and welding at least one side other than the folded side, for example, one side adjacent to the folded side (see a region shown by a broken line in FIG. 5B), so that the clear holder S opens at the other two sides.

One of the open sides has cuts S1 and S2. The cut S1 is used to take out a stored document, and the cut S2 suppresses one welded side from peeling when one open side is opened.

Transparency and good printing characteristics are imparted to the clear holder S having such a structure by using a sheet of a plastic material such as polypropylene, polyethylene terephthalate, or a plant-based biodegradable plastic film.

When an image is printed on the clear holder S, as illustrated in FIG. 11, margin printing is performed to avoid the cuts S1 and S2. In contrast, when marginless printing is performed, as illustrated in FIG. 12, an image protrudes in the cuts S1 and S2, and the image is also printed on the other side of the folded sheet. When a clear holder subjected to marginless printing is produced by stamping a plastic sheet on which an image is printed beforehand, folding the plastic sheet in two, and welding one side, much labor and cost are required.

In the image forming apparatus 1 of the exemplary embodiment, the sizes and positions of the cuts S1 and S2 in the clear holder S are detected by reading and scanning the clear holder S in the reading section 10, and marginless printing is performed while reducing the size of the image around the cuts S1 and S2.

The image forming apparatus 1 acquires image data as print original data used to print an image on a clear holder S (S101).

Next, the clear holder S serving as a recording medium on which an image is to be printed is scanned by the reading section 10 to acquire an image of the recording medium (S102). Specifically, data on the sizes and positions of cuts S1 and S2 of the clear holder S are acquired from scanned data on the clear holder S.

It is determined, from image information obtained by scanning the recording medium by the reading section 10, whether or not the recording medium has a cut (S103). When the recording medium does not have a cut (S103: No), it is further determined whether or not marginless printing is to be performed (S108). When marginless printing is to be performed (S108: Yes), marginless printing is carried out (S107). When margin printing is to be performed (S108: No), normal printing is performed (S109).

When the recording medium on which an image is to be printed has a cut (S103: Yes), the image adjusting unit 213 deletes portions of the image in regions of cuts S1 and S2 (S104). As for deletion of the image, image data on the regions corresponding to the cuts S1 and S2 are deleted from the image data serving as the print original data acquired in Step S101 (see hatched portions R1 and R2 in FIG. 7).

Next, the image adjusting unit 213 reduces the image around the cuts S1 and S2 (see arrows R in FIG. 7) (S105).

Then, it is determined whether or not the clear holder S is set in the manual feeding device 35 (S106). Specifically, when the operator sets the clear holder S in the manual feeding device 35 and inputs instructions through the operation display 40, it is determined by the receiving of the input that the clear holder S is set (S106: Yes).

When it is confirmed that the clear holder S is set in the manual feeding device 35 (S106: Yes), an image is printed on a surface of the clear holder S having the cuts S1 and S2 in a marginless manner (S107).

First Modification

Figure 8:
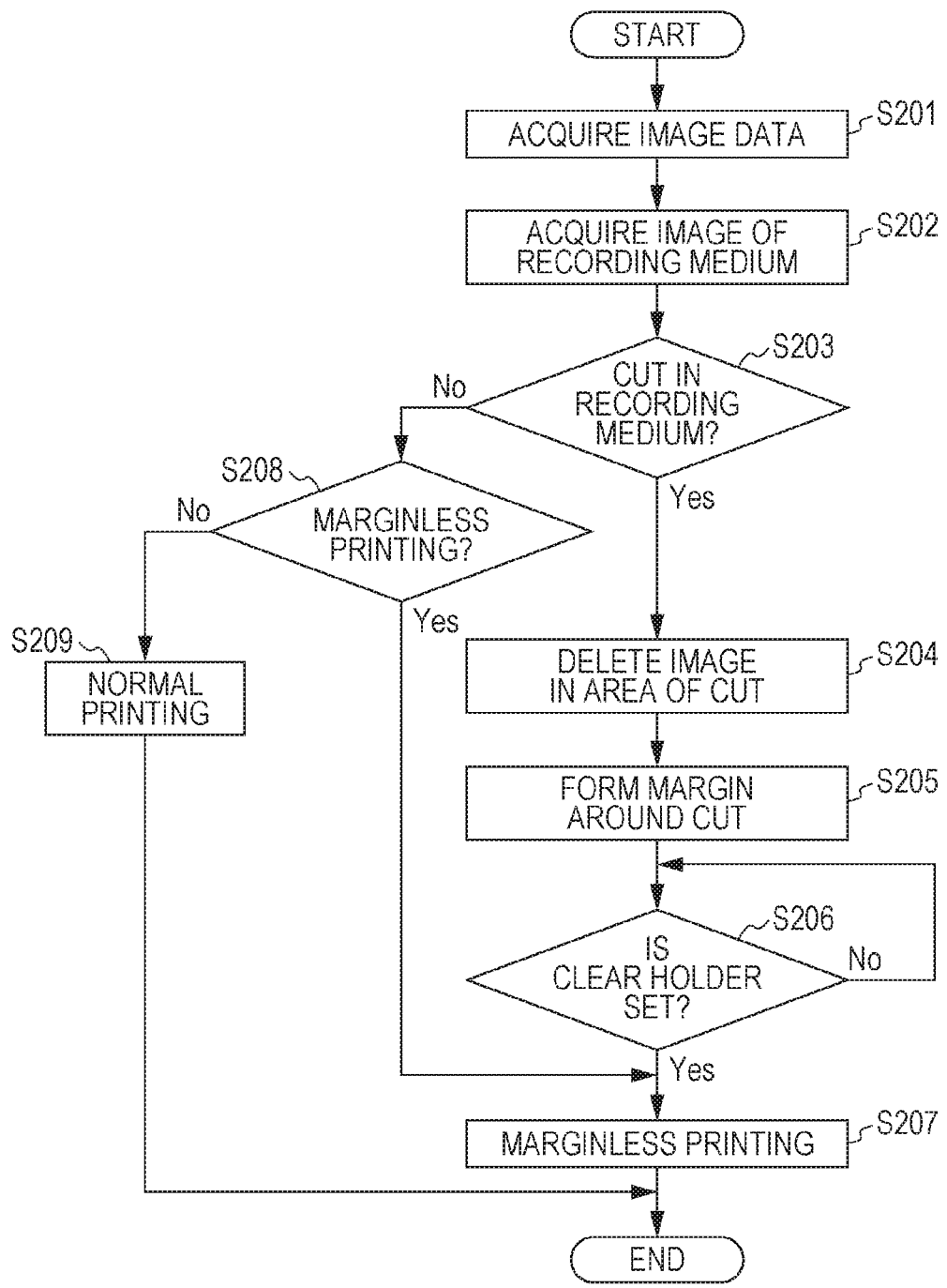
FIG. 8 is a flowchart showing the flow of an image printing operation on a clear holder according to a first modification.
Figure 9:
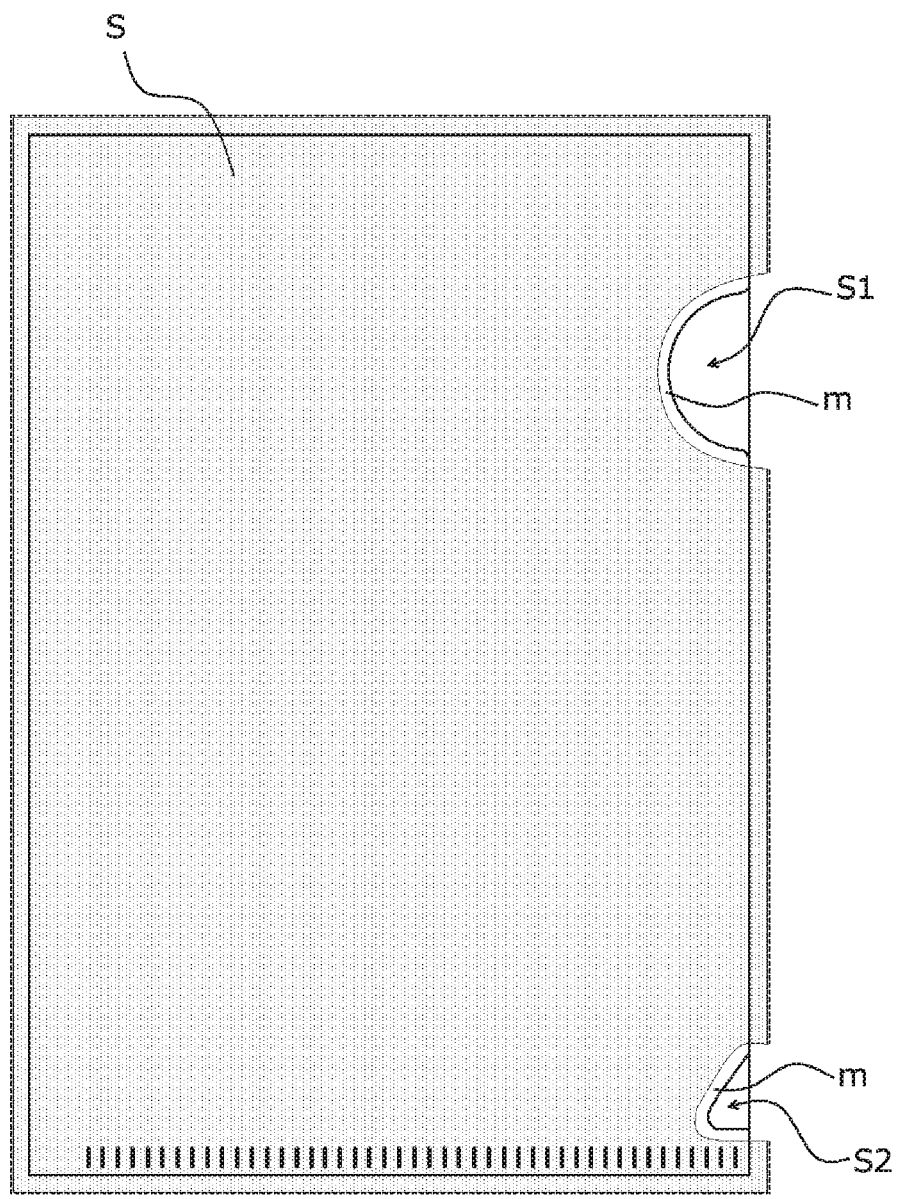
FIG. 9 illustrates image formation on a clear holder while forming margins around cuts.

FIG. 8 is a flowchart showing the flow of operation of image printing on a clear holder S according to a first modification, and FIG. 9 illustrates a case image formation is performed while forming margins around cuts in the clear holder S.

In an image forming apparatus 1 according to the first modification, the sizes and positions of cuts S1 and S2 in the clear holder S are detected by reading and scanning the clear holder S by a reading section 10, an image is reduced to form margins around the cuts S1 and S2, and marginless printing is performed.

After acquiring image data serving as print original data used to print an image on a clear holder S (S201), the image forming apparatus 1 scans the clear holder S serving as a recording medium on which the image is to be printed by the reading section 10, and acquires data on the sizes and positions of the cuts S1 and S2 of the clear holder S from scan data on the clear holder S (S202).

From image information obtained by scanning the recording medium by the reading section 10, it is determined whether the recording medium on which an image is to be printed has a cut (S203). When the recording medium has a cut (S203: Yes), an image adjusting unit 213 deletes image data on regions corresponding to cuts S1 and S2 from the image data acquired as print original data in Step S201 (S204).

Next, the image adjusting unit 213 forms margins m around the cuts S1 and S2 and reduces the image (see FIG. 9) (S205).

Then, it is determined whether or not the clear holder S is set in a manual feeding device 35 (S206). When it is confirmed that the clear holder S is set in the manual feeding device 35 (S206: Yes), the image is printed in a marginless manner on a surface of the clear holder S having the cuts S1 and S2 (S207).

Second Modification

Figure 10:
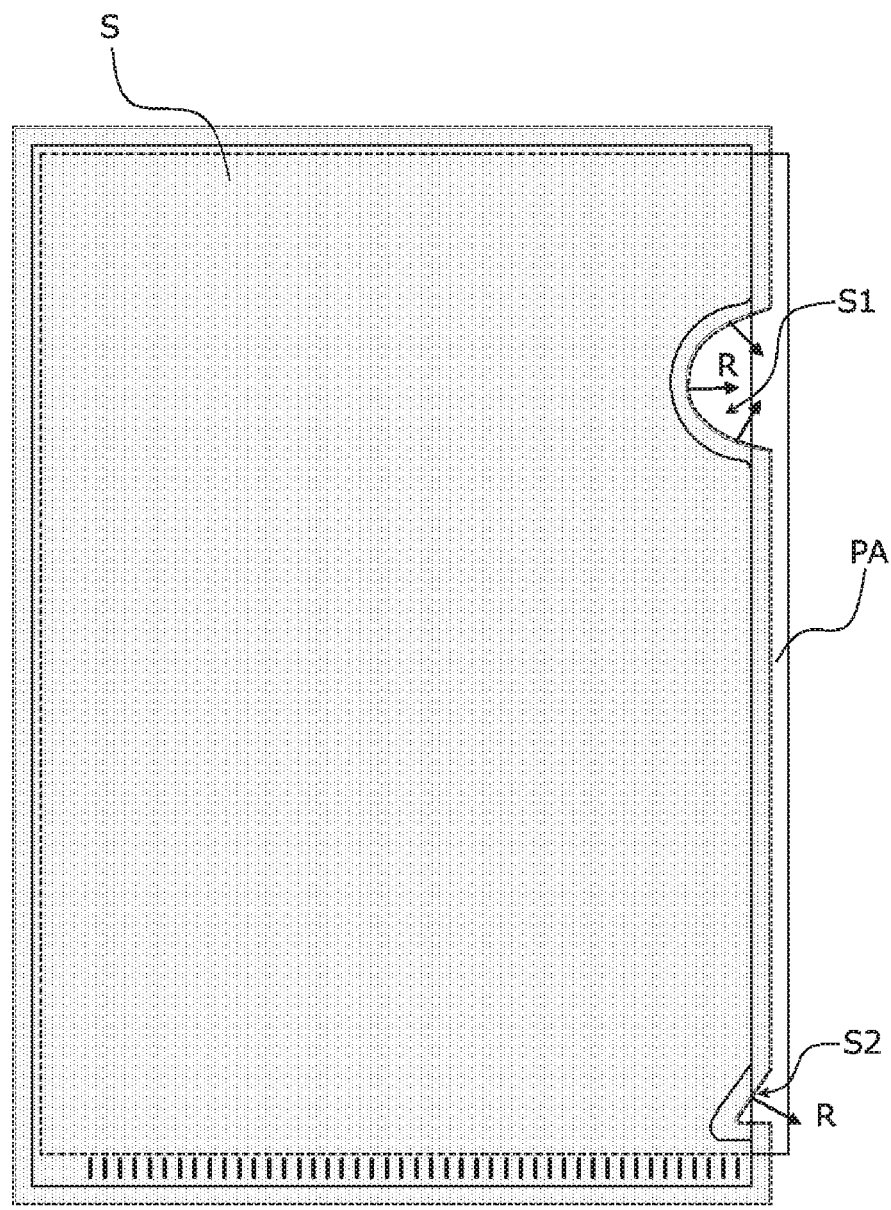
FIG. 10 illustrates marginless printing on a clear holder in which intervening paper is inserted.

FIG. 10 illustrates a case in which marginless printing is performed on a clear holder S in which interleaving paper PA is inserted.

As illustrated in FIG. 10, the intervening paper PA is inserted between superposed sheets from an open side of the clear holder S to cover cuts S1 and S2. In an image forming apparatus 1 according to the second modification, an image is printed in a marginless manner on the clear holder S with the intervening paper PA inserted between the superposed sheets while deleting image portions in the regions of the cuts S1 and S2.

As illustrated in FIG. 10, an image adjusting unit 213 deletes image data on the regions corresponding to the cuts S1 and S2 and magnifies the image around the cuts S1 and S2 (see arrows R in FIG. 10).

While marginless printing is performed on the clear holder S serving as the recording medium having the cuts in the above-described exemplary embodiment, the recording medium having the cuts is not limited to the clear holder S.

On even a pre-punched sheet having three holes arranged at an equal interval along a left margin in a three-punch form to be bound in a three-ring binder and a cutout sheet that has cuts and allows the address, title, and other information to be viewed through the cuts, a predetermined image may be printed in a marginless manner while deleting image data in the regions corresponding to the cuts.

Figure 13:
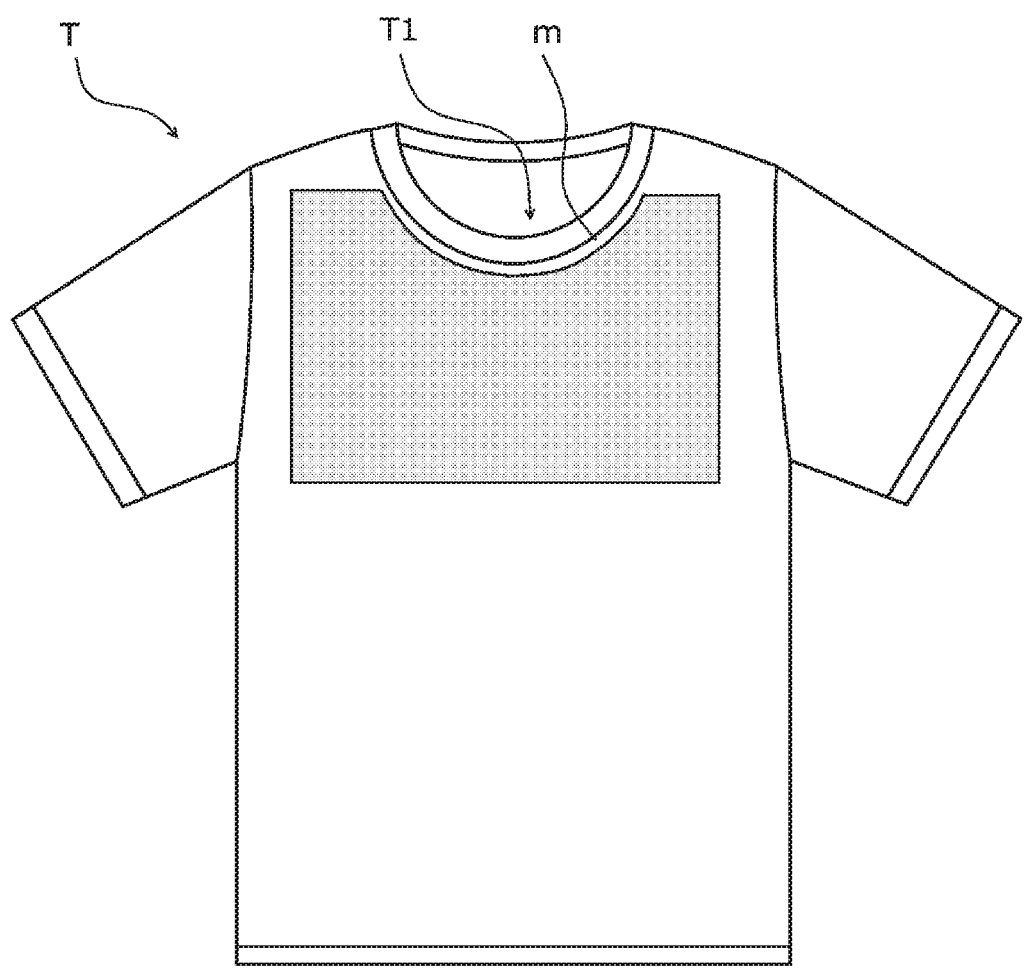
FIG. 13 illustrates a T-shirt serving as a recording medium having a cut.

As another example of a recording medium having a cut, a fabric product, such as a T-shirt, is given, as illustrated in FIG. 13. A T-shirt T has a neck T1 as an example of a cut, and a predetermined image may be printed while deleting image data on a region corresponding to the neck T1.

At the neck T1 of the T-shirt T, an image adjusting unit 213 forms a margin m around the neck T1 and reduces an image (see FIG. 13).

Figure 14:
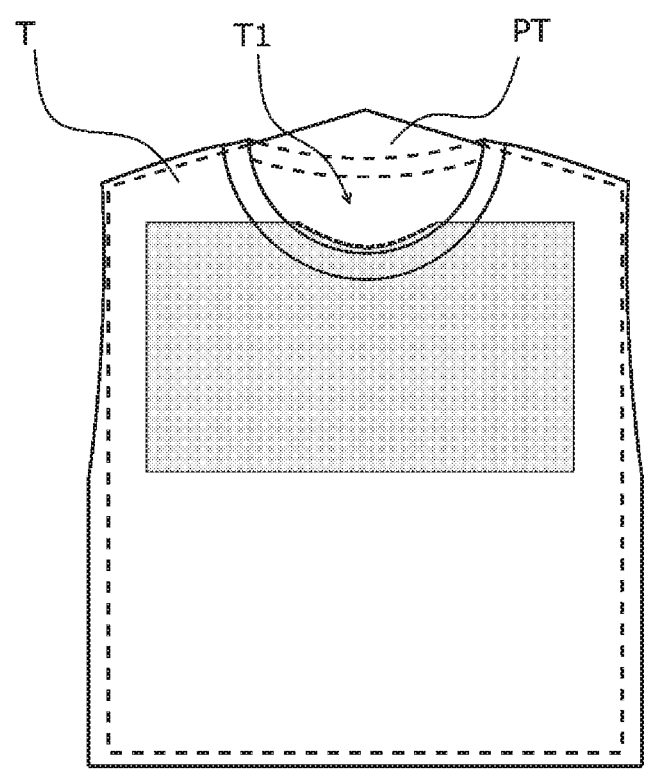
FIG. 14 illustrates marginless printing around a neck of a T-shirt.

When an image is printed on a body section of a T-shirt T serving as a fabric product, as illustrated in FIG. 14, image printing may be performed while keeping the T-shirt T flat by using a substantially rectangular platen plate PT having a V-shaped cut corresponding to a neck T1. The platen plate PT may have other sizes and shapes in accordance with a print section on the fabric product.

For the neck T1 of the T-shirt T thus set on the platen plate PT, an image adjusting unit 213 deletes an image in a region corresponding to the neck T1, and prints an image in a marginless manner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   at least one processor configured to execute:
      an image forming unit that controls forming off an image on a recording medium according to image data; and
      an adjusting unit that adjusts the image around a cut if the recording medium has the cut.

2. The image forming apparatus according to claim 1, wherein the adjusting unit adjusts the image to form the image on the recording medium and deletes a region of the image corresponding to the cut of the recording medium.

3. The image forming apparatus according to claim 2, wherein the adjusting unit reduces the image around the cut.

4. The image forming apparatus according to claim 2, wherein the adjusting unit reduces the image to form a margin around the cut.

5. The image forming apparatus according to claim 1, wherein the at least one processor is further configured to execute a detection unit that detects a position and a size of the cut by reading and scanning the recording medium before printing.

6. The image forming apparatus according to claim 1, wherein the adjusting unit reduces the image around the cut.

7. The image forming apparatus according to claim 1, wherein the adjusting unit reduces the image to form a margin around the cut.

8. The image forming apparatus according to claim 1, wherein the recording medium comprises a clear holder having the cut in one side of superposed sheet parts.

9. The image forming apparatus according to claim 8, wherein the image forming apparatus is configured such that intervening paper is inserted between the superposed sheet parts to cover a region where the cut is provided.

10. The image forming apparatus according to claim 1, wherein the image forming unit is configured to form the image in a marginless manner in an end portion of the recording medium.

* * * * *